United States Patent
Martinez et al.

(10) Patent No.: US 7,934,012 B2
(45) Date of Patent: Apr. 26, 2011

(54) AUTOMATIC TRANSLATION CODE GENERATION

(75) Inventors: Juan Carlos Martinez, Mannheim (DE); Ralf Philipp, Dielheim (DE); Frank Sommerlade, Wiesioch (DE)

(73) Assignee: SAP AG, Walldorf (DE)

( * ) Notice: Subject to any disclaimer, the term of this patent is extended or adjusted under 35 U.S.C. 154(b) by 1636 days.

(21) Appl. No.: 10/800,312

(22) Filed: Mar. 12, 2004

(65) Prior Publication Data

US 2005/0204055 A1 Sep. 15, 2005

(51) Int. Cl.
G06F 15/16 (2006.01)
G06F 15/173 (2006.01)
G06F 11/00 (2006.01)
G06F 17/00 (2006.01)
G06F 9/44 (2006.01)

(52) U.S. Cl. ........ 709/232; 709/219; 709/223; 709/225; 709/245; 370/241; 715/234; 717/106; 717/108

(58) Field of Classification Search .................. None
See application file for complete search history.

(56) References Cited

U.S. PATENT DOCUMENTS

| | | | | |
|---|---|---|---|---|
| 5,692,157 A * | 11/1997 | Williams | ...................... | 709/246 |
| 5,884,325 A * | 3/1999 | Bauer et al. | .................... | 707/201 |
| 5,943,674 A * | 8/1999 | Schofield | ................... | 707/104.1 |
| 6,473,526 B1 * | 10/2002 | Enokida | ......................... | 382/232 |
| 6,615,212 B1 * | 9/2003 | Dutta et al. | ...................... | 707/10 |
| 6,768,994 B1 * | 7/2004 | Howard et al. | ................. | 707/10 |
| 6,826,597 B1 * | 11/2004 | Lonnroth et al. | ............. | 709/207 |
| 6,873,997 B1 * | 3/2005 | Majjasie et al. | ........... | 707/104.1 |
| 7,155,670 B2 * | 12/2006 | Takizawa et al. | ............. | 715/239 |
| 7,257,615 B2 * | 8/2007 | Eilers et al. | .................... | 709/203 |
| 7,313,596 B2 * | 12/2007 | Tani et al. | ...................... | 709/205 |
| 7,389,179 B2 * | 6/2008 | Jin et al. | ........................ | 701/207 |
| 7,493,599 B2 * | 2/2009 | Devor et al. | ................... | 717/130 |
| 2001/0050690 A1 * | 12/2001 | Giles et al. | ..................... | 345/636 |
| 2002/0053475 A1 * | 5/2002 | Bitsche et al. | ............... | 180/65.1 |
| 2002/0092004 A1 * | 7/2002 | Lee et al. | ....................... | 717/140 |
| 2002/0095459 A1 * | 7/2002 | Laux et al. | .................... | 709/203 |
| 2002/0122060 A1 * | 9/2002 | Markel | ......................... | 345/760 |
| 2002/0169833 A1 * | 11/2002 | Tani et al. | ..................... | 709/205 |

(Continued)

FOREIGN PATENT DOCUMENTS

WO WO 01/46837 A2 6/2001

OTHER PUBLICATIONS

Arbouzov et al., Extensible Markup Language (XML) 1.1, Nov. 5, 2003, W3C, introduction.*

(Continued)

*Primary Examiner* — Moustafa M Meky
*Assistant Examiner* — Ho Shiu
(74) *Attorney, Agent, or Firm* — Finnegan, Henderson, Farabow, Garrett & Dunner, LLP

(57) ABSTRACT

The present invention provides methods and systems for automatic translation code generation. The client transmits a data object message comprising the current data model of the client to the server. The server automatically generates a new translation code based on the current data model of the client. The newly generated translation code may then be used to convert the data in the server into a data format required by the client. If the current data model of the client changes, the translation code on the server may be automatically adapted according to the changed data format and data on the server is converted with the adapted translation code.

50 Claims, 3 Drawing Sheets

U.S. PATENT DOCUMENTS

| | | | |
|---|---|---|---|
| 2003/0014617 A1* | 1/2003 | Tamboli et al. | 713/1 |
| 2003/0149935 A1* | 8/2003 | Takizawa et al. | 715/513 |
| 2003/0206717 A1* | 11/2003 | Yogeshwar et al. | 386/69 |
| 2003/0233383 A1* | 12/2003 | Koskimies | 707/204 |
| 2004/0010753 A1* | 1/2004 | Salter et al. | 715/513 |
| 2004/0015366 A1 | 1/2004 | Wiseman et al. | |
| 2004/0019853 A1* | 1/2004 | Takizawa et al. | 715/523 |
| 2004/0032860 A1* | 2/2004 | Mundra et al. | 370/352 |
| 2004/0078785 A1* | 4/2004 | Dutt et al. | 717/136 |
| 2004/0122892 A1* | 6/2004 | Brittenham et al. | 709/203 |

OTHER PUBLICATIONS

Linthicum, David S., "Enterprise Application Integration; Message Brokers—The Preferred EAI Engine," 2000, pp. 291-317, Addison-Wesley Publishers.

\* cited by examiner

AUTOMATIC TRANSLATION CODE GENERATION

FIELD OF THE INVENTION

The present invention relates to computer-implemented methods and systems for automatically configuring a translation code for use in translating data stored in a server into a data format required by a client.

BACKGROUND

In large corporations and institutions, computer networks today are generally comprised of many different data management systems and thus provide a heterogeneous landscape. Moreover, over time, such data management systems frequently become more and more heterogeneous, as new systems are integrated into the landscape and existing systems are updated.

Such data management systems may store and provide data in any number of different data formats. The use of standard messaging technologies, like extended markup language (XML), facilitates the providing and exchanging data between different systems with reduced difficulty; however, not all data management systems use standardized formats and languages. Therefore, many times when a client requests data from a server, the relevant data may first have to be converted from one format to another before it is transmitted from the server to the client.

Sometimes, manual hard coding of the necessary conversion routines is done for transmitting converted data from a server to a client. Hard coding of the conversion routines, however, is costly, inflexible, and labour intensive. As a result, rather than manually change a hard-coded conversion routine, it is common practice to provide more data to the client than actually necessary and relevant for the particular client. This practice consumes bandwidth and produces traffic that is not necessary.

Automatic translation code generation would provide the data requested by the client in an appropriate data format and allow transfer of only the relevant data, thus saving bandwidth. One example of a known code generator is described in Christian Georgescu, "Code Generation Templates Using XML and XSL", C/C++ Users Journal, January 2002, p. 6-19. In Georgescu, an implementation of XML or XSL for Java and C++ code generation is discussed. These code generators allow generation of C++ or Java computer code from a data set of a different data format. A meta-model of the provided data provides a structure for an information model that comprises data in XML-format. Using the meta-model, a design logic may be coded in XSL for generating implementation logic that allows a code generator to code the information model into a different data format without manual labour.

However, even with known code generators, it is not possible to react automatically to changes within a data format required by a client. The known code generators alone do not provide automatic adaptation to changes in a data object model, e.g a data format, on the side of the client.

SUMMARY

The present invention provides methods and systems for automatic translation code generation. In certain embodiments consistent with the present invention, the client transmits a data object message comprising the current data model of the client to the server. The server automatically generates a new translation code based on the current data model of the client. The newly generated translation code may then be used to convert the data in the server into a data format required by the client.

Certain embodiments consistent with the present invention provide the data requested by the client in an appropriate data format. When only relevant data is transferred, unnecessary data need not be transmitted and bandwidth may be saved. Moreover, by automatically generating translation codes, manual re-coding is unnecessary and the time needed to react to changes may be minimized. Furthermore, by avoiding manual re-coding, coding errors and the number of personnel needed to implement changes may be reduced. Different and new clients may be quickly added or removed from the network. Clients only need to be able to deliver data object definition messages to the server. The data object definition messages comprise information about the data format required by the client. The knowledge of this data format allows the server to adapt a translation code to a certain client.

BRIEF DESCRIPTION OF THE DRAWINGS

The accompanying drawings, which are incorporated in and constitute a part of this specification, illustrate various embodiments of the invention and, together with the description, serve to explain the principles of the invention. In the drawings.

DETAILED DESCRIPTION

Methods and systems consistent with the principles of the present invention enable a server to automatically generate a new translation code based on the current data model of the client. The newly generated translation code may then be used to convert the data in the server into a data format required by the client.

Figure 1:
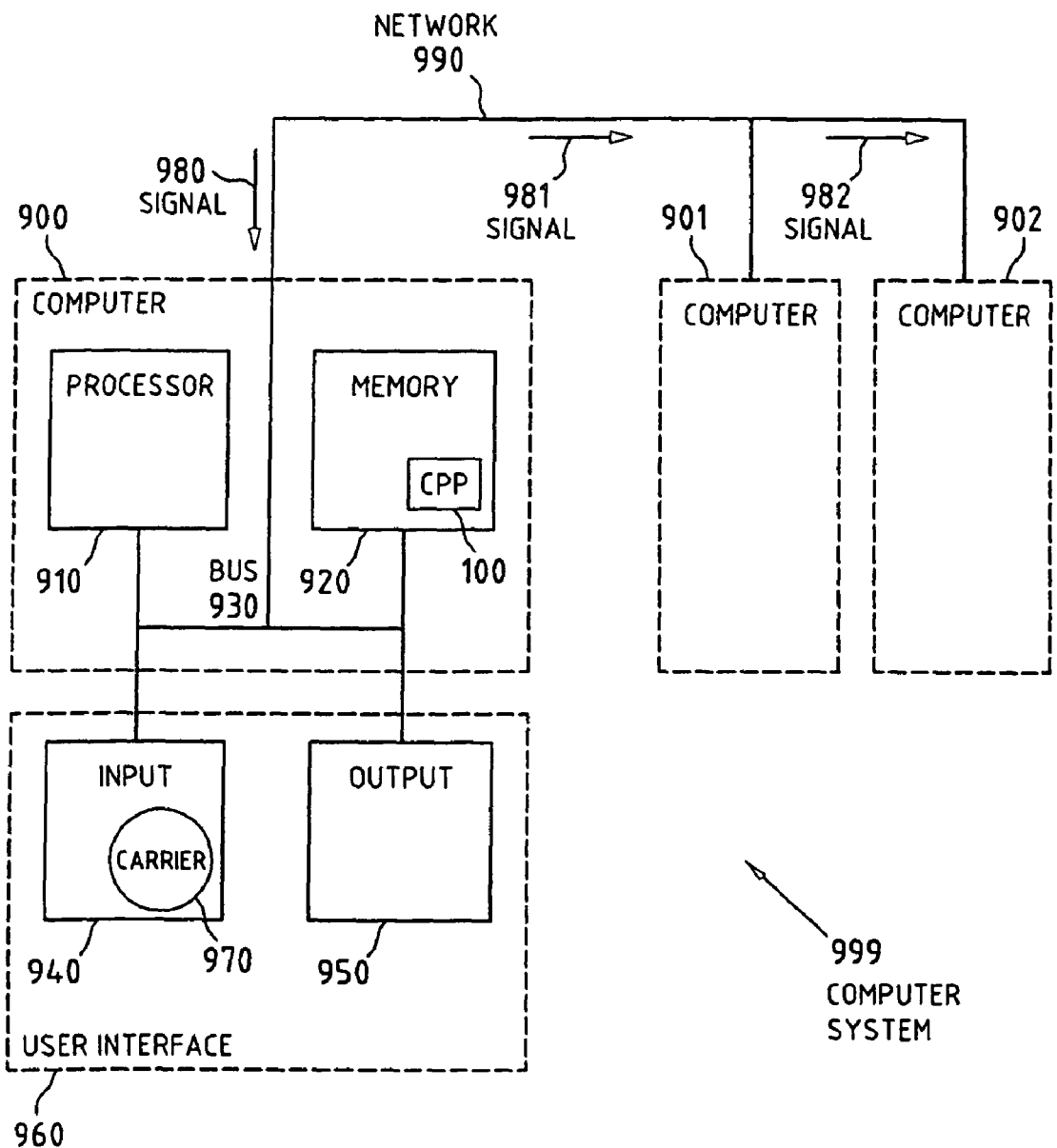
FIG. 1 illustrates an exemplary computer system used to implement one or more embodiments of the present invention.

FIG. 1 illustrates a simplified block diagram of an exemplary computer system 999 for implementing the principles of the present invention. As shown in FIG. 1, computer system 999 may have a plurality of computers 900, 901, 902 (or even more). Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

With respect to computer 900, computer 901/902 is sometimes referred to as a "remote computer." Computer 901/902 may be, for example, a server, a peer device or other common network node, and may have many or all of the elements described relative to computer 900.

Computer 900 may be, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 may be, for example, a central processing unit (CPU), a micro-controller unit (MCU), a digital signal processor (DSP), or the like.

Memory 920 may be one or more elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick.

Optionally, memory 920 can be distributed. Portions of memory 920 can be removable or non-removable. For reading from media and for writing in media, computer 900 may use well-known devices such as, for example, disk drives, tape drives, etc.

Memory 920 stores modules such as, for example, a basic input output system (BIOS), an operating system (OS), a program library, a compiler, an interpreter, and a text-processing tool. Such modules are commercially available and can be installed on computer 900. As they are well known in the state of the art, such modules are not illustrated in FIG. 1.

CPP 100 has program instructions and, optionally, data that cause processor 910 to execute method steps consistent with the present invention. In other words, CPP 100 can control the operation of computer 900 and its interaction in network system 999 so that it operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 may be conveniently inserted into input device 940. Carrier 970 may be implemented as any computer readable medium, such as a medium largely explained above (cf. memory 920). Carrier 970 may be an article of manufacture having a computer readable medium with computer readable program code to cause the computer to perform methods of the present invention. Further, signal 980 can also embody computer program product 100.

Examples of CPP 100, carrier 970, and signal 980 have been described in connection with computer 900. However, other type of carriers and signals may embody computer program products (CPP) to be executed by further processors in computers 901 and 902.

Input device 940 provides data and instructions for processing by computer 900. Device 940 can be, for instance, a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optionally, as they may or may not pertain to various embodiments of the present invention.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network may be electrical, electromagnetic, optical or wireless (radio) signals.

Networks are commonplace in offices, enterprise-wide computer networks, intranets and the Internet (e.g., world wide web or WWW). Network 990 can be a wired or a wireless network. To name a few network implementations, network 990 can be, for example, a local area network (LAN), a wide area network (WAN), a public switched telephone network (PSTN); a Integrated Services Digital Network. (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known and may include, for example, transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art, and not shown in FIG. 1. An interface can be, for example, a serial port interface, a parallel port interface, a game port, a universal serial bus (USB) interface, an internal or external modem, a video adapter, or a sound card.

Computers and the programs that operate them are closely related. As used hereinafter, phrases, such as "the computer provides" and "the program provides," are used interchangeably to express actions by a computer that is controlled by a program.

Figure 2:
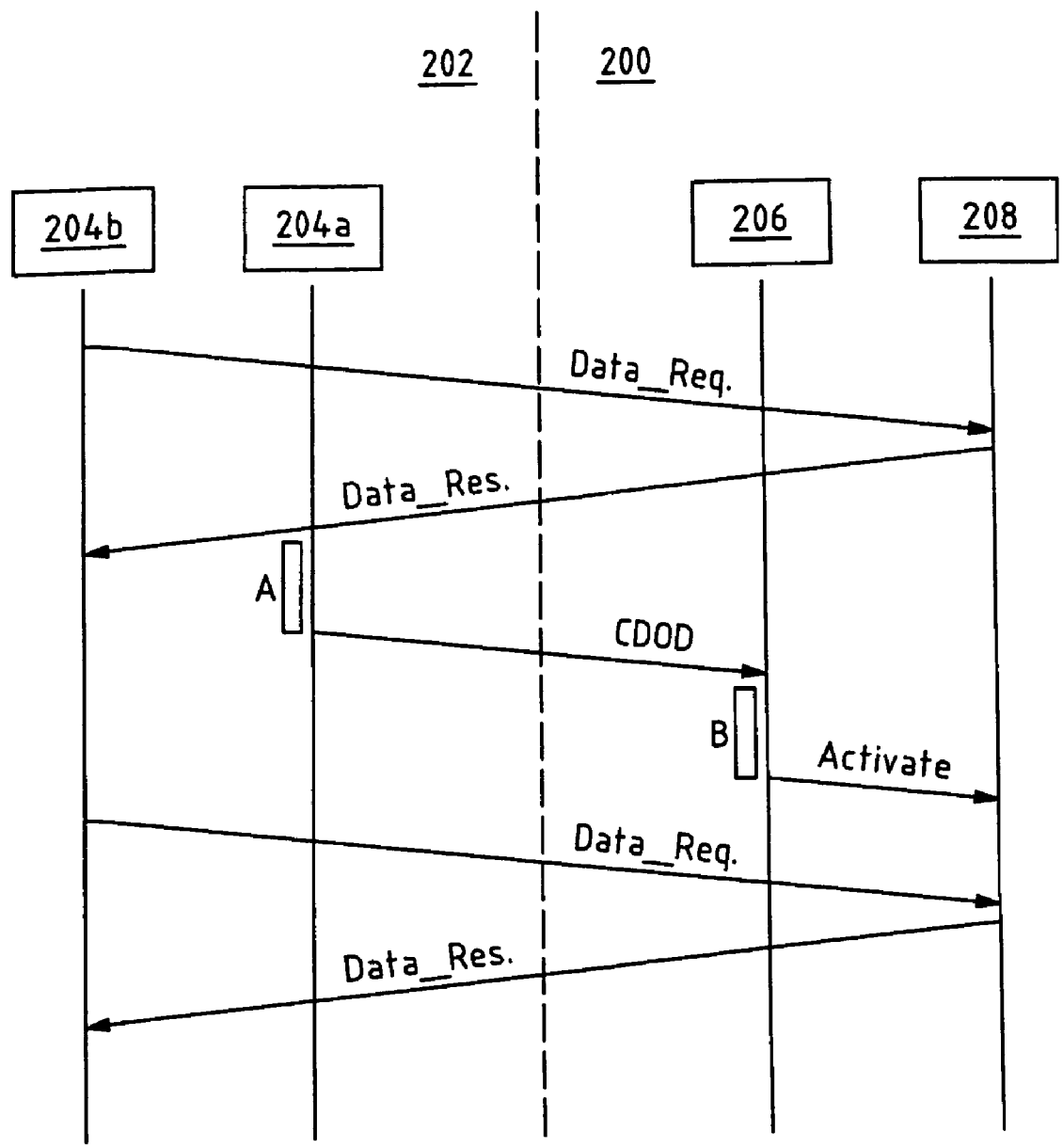
FIG. 2 is a diagram illustrating translation code generation after a change in the object model, according to one or more embodiments of the present invention.

FIG. 2 is a diagram illustrating translation code generation after a change in the object model, according to one or more embodiments of the present invention. In FIG. 2, a client 202 and a server 200 are shown. The client 202 comprises a data object definition tool 204a and a data management tool 204b. Server 200 comprises a translation code generator 206 and a data translation service 208. Depicted is a flow chart of messages between the client 202 and the server 200.

During normal operation of the embodiment shown in FIG. 2, data management tool 204b requests data from data translation service 208 data of the server 200. This is done via a request message Data_Req. Within data translation service 208, the data requested by the client 202 is extracted from the data in the server and put into a data format required by the client 202. The data is translated into a data format for the client 202 using translation code that has been adapted to the data model of the client 202. Thus, the data within the server is put into the right format and then transmitted from the server 200 to the client 202 in a response message Data_Res.

In the event that the data model within the client 202 changes, element A in this embodiment of FIG. 2, the data object definition tool 204*a* transmits a client data object definition message CDOD to translation code generator 206 within server 200. Upon receipt of this client data object definition message CDOD, translation code generator 206 generates a new translation code, element B, depending on the object model of the client 202. The data object definition message comprises information about the data format requested by the client 202. After the translation code is generated B this translation code is activated and transmitted to data translation service 208.

After activation of a new translation code, this translation code may be used by data translation service 208. In this case, after receipt of a new data request message Data_Req from data management tool 204*b*, data translation service 208 translates the data in the server according to the new translation code, and responds to the request message by transmitting the data in the correct data format Data_Res.

By adapting the translation code automatically, no manual coding or adaptation of the translation code is necessary.

Figure 3:
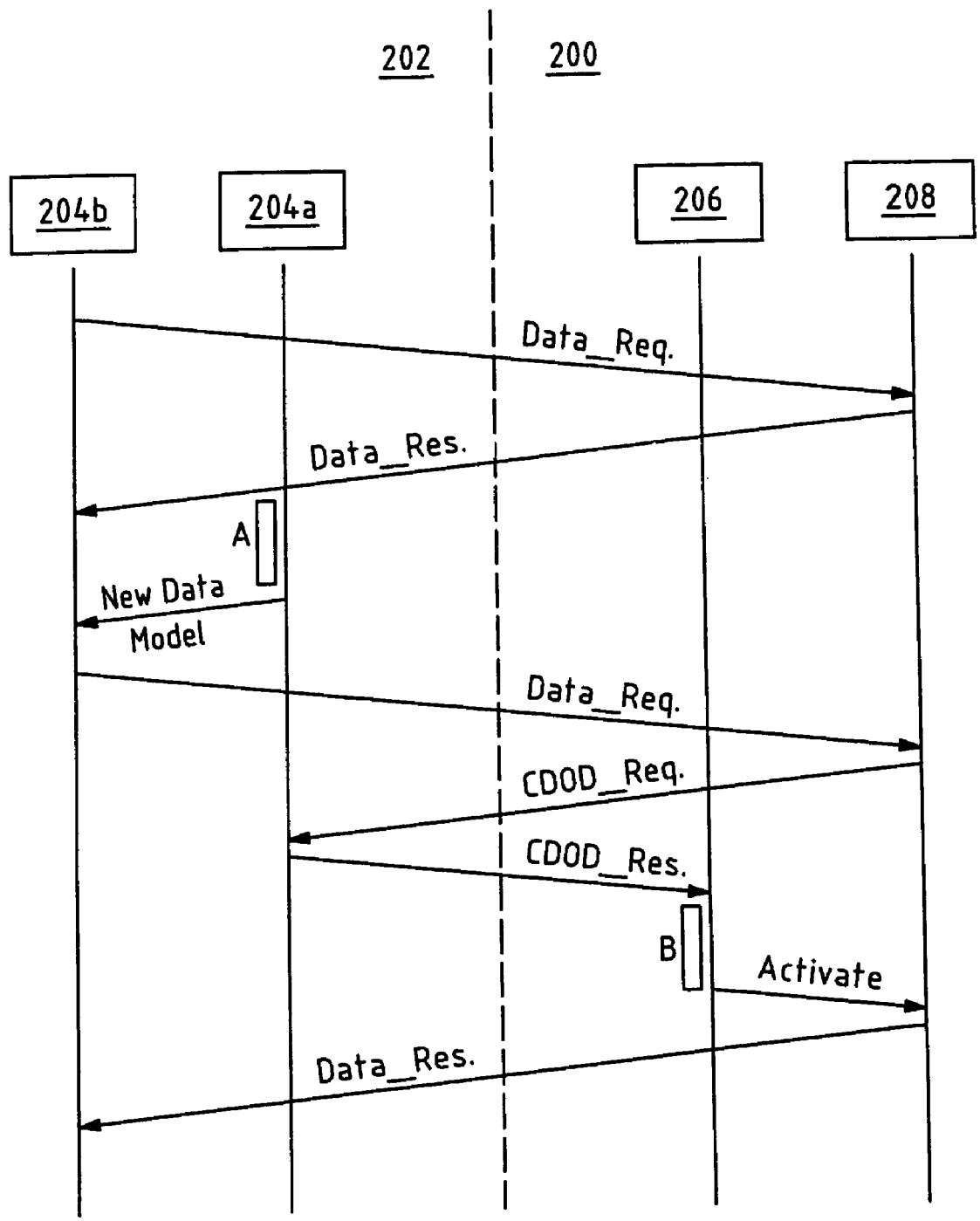
FIG. 3 is a diagram illustrating translation code generation after receiving data with a new data object definition, according to one or more embodiments of the present invention.

FIG. 3 is a diagram illustrating translation code generation after receiving data comprising a new data object definition, according to one or more embodiments of the present invention. During normal operation of the embodiment of FIG. 3, data management tool 204*b* requests data Data_Req from data translation service 208 within server 200. Data translation service 208 translates data within the server and provides the translated data in an appropriate data format to the client 202.

In the event that the data model within the client 202 changes, element A, the data object definition tool 204*a* informs data management tool 204*b* about the new data model in a new data model message. Upon the next data request Data_Req, the data request message may comprise information that a new data model is supported by client 202. The receiving server 200, in particular the data translation service 208, detects that a new data model is supported by the client 202. This may be done, for example, by using version management within data translation service 208.

If a new data model is required by the client 202 and detected within the server 202, translation code generator 206 may request CDOD_Req a data object definition message from data object definition tool 204*a*. Data object definition tool 204*a* provides the translation code generator 206 with the new client data object definition message in a response message CDOD_Res. In translation code generator 206, a new translation code is generated B.

New translation code B is activated and provided to data translation service 208. Data translation service 208 uses the new translation code for translating the data requested by the client in the previous data request message. The data response message Data_Res now is in an appropriate format as the new translation code has been used.

Within data translation service 208, or within any other entity of server 200, an authorization control may be activated. Such activation means that the client 202 may only access data and may only initiate a change within the translation code if it has authorization to do so. This authorization may be checked by the server 200.

In certain embodiments, the data object definition message is automatically transmitted from the client to the server upon change of the data format within the client. In this case, a data object definition, e.g. a data format, has been modified at the side of the client. This modification may trigger transmitting the data containing the data object definition message from the client to the server. The server might only need to listen to incoming data object definition messages and may then use these messages for extracting the information requested by the clients and for re-coding automatically the translation code.

In certain embodiments, the translation code is adapted to the changed data format within a translation code generator upon reception of the data object definition message. Within the translation code generator different translation codes may be stored for different clients and different systems.

According to at least one embodiment, the translated data may be transmitted from the server to the client using a standard object description language like, for example an extended markup language (XML). By using a standard object description language, implementation is simplified and programmers may use their common programming knowledge. The same applies for an embodiment wherein the data object definition message is transmitted from the client to the server using a standard object description language, for example an extended markup language. The data object definition message may then comprise content and structure, as XML allows storing structured content.

According to certain embodiments, the data required by the client is extracted and translated from the stored data by the translation code prior to sending the translated data from the server to the client. The translation code is used for extracting the relevant data from the data stored in the server. The relevant data may then be translated into a data format preferred by the particular client. This may be done prior to sending the data to the client.

By using XSL for translating in the translation code the data into the data format used by the client, standard programming routines and programming knowledge may be used.

In certain embodiments, to avoid "information loops" with respect to the data format of the data provided to the clients, it may be important to fix the roles of server and client within the process. The server must publish and have the ownership of the data definition format. A client may be responsible for definition and distribution of the meta-data of the data objects being used.

Since data object definition messages received within the server may directly modify code on the server side, authorization management may be used in order to control and restrict the reaction of the server to different data object definition messages. Therefore, access to the server by the data object definition messages may be controlled by authorization management. The authorization management may be comprised within the server. It may keep track of clients authorized to initiate translation code generation, which may be so-called "trusted systems". Moreover, authorization may be based on user "roles". Each user may have certain rights. E.g. system administrators may have all the same rights. Coded information about the users may be sent embedded in messages exchanged between servers and clients.

To connect more than one data client to a single server, data formats of different clients may be managed by version management within the server. In this case, a particular translation code for a particular client may be stored and a different translation code may be used for each client. Also clients of different groups, e.g. different data management systems, may use one particular translation code. Version identification may be based on two parameters, which may be encapsulated and exchanged within messages between clients and servers. One parameter may comprise information concerning the data model version, e.g. by using time stamps or other string combinations. This allows identification within the system. Another parameter may allow the identification of a system within a computer network. This could be for example an IP number.

In at least one embodiment of a computer-implemented method consistent with the present invention, upon change of the data format, the server requests the data object definition message from the client and the client transmits the data object definition message upon request to the server. By using data format version identification within a server, the server may detect automatically changes in the data format of the client. This may be done during exchange of master data. When a new data format is detected by the server, the server may trigger the request of a new data object definition message. Upon receipt of this data object definition message, the server may trigger a generation of a new data translation code for the given client. The existing translation code may then be re-coded. Thereafter, data to be transmitted to the client will be translated by the new translation code.

A further aspect of the invention is a computer program product for automatically configuring a translation code, the program comprising instructions operable to cause the processor to store data within a server, translate the data into a data format required by a client using the translation code within the server, transmit the translated data from the server to the client, transmit a change of the data format from the client to the server in a data object definition message and adapt automatically the translation code to the changed data format upon reception of the data object definition message.

Yet a further aspect of the invention is a computer system for automatically configuring a translation code with storage means for storing data within a server, the server comprising a translation code generator, and the server comprising translation means for translating data into a data format required by a client using a translation code from the translation code generator, transmission means for transmitting the translated data from the server to the client, and transmitting a change of the data format within a data object definition message from the client to the server wherein the translation code generator comprising adaptation means for adapting the translation code automatically to the changed data format upon reception of the data object definition message.

While the invention has been particularly shown and described with reference to examples and embodiments described above and illustrated in the figures, it is to be understood by those skilled in the art that various changes in form and detail may be made without departing from the spirit and scope of the invention. For example, the scope of the invention is in no way limited to the exemplary computer systems described and illustrated herein. In sum, the metes and bounds of the present invention include the described embodiments and examples as well as all variations and modifications thereof, and shall be limited soley by the scope of the claims appended hereto.

REFERENCE NUMBERS 200 server
202 client
204a data object definition tool
204b data management tool
206 translation code generator
208 data translation service
900 computer
910 processor
920 memory
930 bus
940 input device
950 output device
960 user interface
970 program carrier
980 program signal
999 computer network system

What is claimed is:

1. A computer-implemented method for automatically configuring a plurality of translation codes, the method performed by a server which includes a memory for storing client-translation code association information for associating each of the plurality of translation codes with one or more of a plurality of clients, the method comprising:
    storing, in the memory, the client-translation code association information including first information that indicates an association between a first translation code and one client of the plurality of clients, the first translation code used for data translation to a first data format required by the one client;
    translating, using the first translation code, data within the server into the first data format;
    transmitting the translated data to the one client;
    automatically detecting a change during an exchange of information with the one client, the change indicating that the one client requires a second data format different from the first data format;
    receiving information related to the second data format from the one client in a data object definition message;
    automatically generating a second translation code for data translation to the second data format;
    replacing, in the client-translation code association information stored in the memory, the first information with a second information that indicates an association between the second translation code and the one client;
    newly translating, using the second translation code, data within the server into the second data format; and
    transmitting the newly translated data to the one client,
    wherein the data object definition message is authorized by an authorization management unit on the server used to control and restrict the reaction of the server to the data object definition message.

2. The computer-implemented method of claim 1, wherein the data object definition message is automatically transmitted from the client to the server upon detecting the change.

3. The computer-implemented method of claim 2, wherein the second translation code is generated within a translation code generator upon receipt of the data object definition message.

4. The computer-implemented method of claim 2, wherein the translated data is transmitted from the server to the client using a standard object description language.

5. The computer-implemented method of claim 2, wherein the data object definition message is transmitted from the client to the server using a standard object description language.

6. The computer-implemented method of claim 2, wherein the data format required by the client is extracted and translated from the stored data by the translation code prior to sending the translated data from the server to the client.

7. The computer-implemented method of claim 2, wherein the translation code uses XSL for translating the data into said data format required by the client.

8. The computer-implemented method of claim 2, wherein the server provides a data object definition message format.

9. The computer-implemented method of claim 2, further comprising the step of managing access to the server by the data object definition messages via an authorization management procedure.

10. The computer-implemented method of claim 2, further comprising the step of managing data formats of different clients via a version management procedure.

11. The computer-implemented method of claim 1, wherein, upon automatically detecting the change, the server requests the data object definition message from the one client.

12. The computer-implemented method of claim 11, wherein the second translation code is generated within a translation code generator upon reception of the data object definition message.

13. The computer-implemented method of claim 11, wherein the translated data is transmitted from the server to the client using a standard object description language.

14. The computer-implemented method of claim 11, wherein the data object definition message is transmitted from the client to the server using a standard object description language.

15. The computer-implemented method of claim 11, wherein the data required by the client is extracted and translated from the stored data by the translation code prior to sending the translated data from the server to the client.

16. The computer-implemented method of claim 11, wherein the translation code uses XSL for translating the data into the data format used by the client.

17. The computer-implemented method of claim 11, wherein the server provides a data object definition message format.

18. The computer-implemented method of claim 11, further comprising the step of managing access to the server by the data object definition messages via an authorization management procedure.

19. The computer-implemented method of claim 11, further comprising the step of managing data formats of different clients via a version management procedure.

20. The computer-implemented method of claim 1, wherein the change in the data format is detected by version identification.

21. The computer-implemented method of claim 1, wherein the authorization management unit authorizes the data object definition message if the one client is authorized to initiate translation code generation.

22. The computer-implemented method of claim 1, wherein the authorization management unit authorizes the data object definition message based on user roles.

23. A non-transitory computer readable storage medium embodying a program of instructions that, when executed by a server computer, cause the server computer to perform a method for automatically configuring a plurality of translation codes, the method comprising:
    storing, in a memory of the server computer, client-translation code association information including first information that indicates an association between a first translation code and one client of a plurality of clients, the first translation code used for data translation to a first data format required by the one client;
    translating data within the server into the first data format using the first translation code;
    transmitting the translated data to the one client;
    automatically detecting a change during an exchange of information with the one client, the change indicating that the one client requires a second data format different from the first data format;
    receiving information related to the second data format from the one client in a data object definition message;
    authorizing the data object definition message by an authorization management unit used to control and restrict the reaction of the server to the data object definition message;
    automatically generating a second translation code for data translation to the second data format;
    replacing, in the client-translation code association information stored in the memory of the server computer, the first information with a second information that indicates an association between the second translation code and the one client;
    newly translating, using the second translation code, data within the server into the second data format; and
    transmitting the newly translated data to the one client.

24. The non-transitory computer readable storage media of claim 23, wherein the program further comprises instructions operable to cause the computer to automatically transmit the data object definition message from the client to the server upon detecting the change.

25. The non-transitory computer readable storage media of claim 24, wherein the program further comprises instructions operable to cause the computer to generate the second translation code within a translation code generator upon reception of the data object definition message.

26. The non-transitory computer readable storage media of claim 24, wherein the program further comprises instructions operable to cause the computer to transmit the translated data from the server to the client using a standard object description language.

27. The non-transitory computer readable storage media of claim 24, wherein the program further comprises instructions operable to cause the computer to transmit the data object definition message from the client to the server using a standard object description language.

28. The non-transitory computer readable storage media of claim 24, wherein the program further comprises instructions operable to cause the computer to extract and translate the data required by the client from the stored data prior to sending the translated data from the server to the client.

29. The non-transitory computer readable storage media of claim 24, wherein the program further comprises instructions operable to cause the computer to use XSL in the translation code for translating the data into the data format used by the client.

30. The non-transitory computer readable storage media of claim 24, wherein the program further comprises instructions operable to cause the computer to provide, via the server, a data object definition message format.

31. The non-transitory computer readable storage media of claim 24, wherein the program further comprises instructions operable to cause the computer to manage, via an authorization management process, access to the server by the data object definition messages.

32. The non-transitory computer readable storage media of claim 24, wherein the program further comprises instructions operable to cause the computer to manage, via a version management procedure, data formats of different clients.

33. The non-transitory computer readable storage media of claim 23, wherein the program further comprises instructions operable to cause the computer, upon automatically detecting the change, to initiate a server request for the data object definition message from the one client.

34. The non-transitory computer readable storage media of claim 33, wherein the program further comprises instructions operable to cause the computer to generate the second translation code within a translation code generator upon reception of the data object definition message.

35. The non-transitory computer readable storage media of claim 33, wherein the program further comprises instructions operable to cause the computer to transmit the translated data from the server to the client using a standard object description language.

36. The non-transitory computer readable storage media of claim 33, wherein the program further comprises instructions operable to cause the computer to transmit the data object definition message from the client to the server using a standard object description language.

37. The non-transitory computer readable storage media of claim 33, wherein the program further comprises instructions operable to cause the computer to extract and translate the data required by the client from the stored data, via a translation code procedure, prior to sending the translated data from the server to the client.

38. The non-transitory computer readable storage media of claim 33, wherein the program further comprises instructions operable to cause the computer to use XSL in the translation code for translating the data into the data format used by the client.

39. The non-transitory computer readable storage media of claim 33, wherein the program further comprising instructions operable to cause the computer to provide, via the server, a data object definition message format.

40. The non-transitory computer readable storage media of claim 33, wherein the program further comprises instructions operable to cause the computer to manage, via an authorization management procedure, access to the server by the data object definition messages.

41. The non-transitory computer readable storage media of claim 33, wherein the program further comprises instructions operable to cause the computer to manage, via a version management procedure, data formats of different clients.

42. The non-transitory computer readable storage media of claim 23, wherein the program further comprises instructions operable to cause the computer to detect the changes in the data format by use of a version identification procedure.

43. The non-transitory computer readable storage medium of claim 23, wherein the authorization management unit authorizes the data object definition message if the one client is authorized to initiate translation code generation.

44. The non-transitory computer readable storage medium of claim 23, wherein the authorization management unit authorizes the data object definition message based on user roles.

45. A server computer system for automatically configuring a plurality of translation codes, the system comprising:
    a memory for storing client-translation code association information for associating each of the plurality of translation codes with one or more of a plurality of clients;
    means for storing, in the client-translation code association information stored in the memory, first information that indicates an association between a first translation code and one client of the plurality of clients, the first translation code used for data translation to a first data format required by the one client;
    a translating means for translating, using the first translation code, data within the server into the first data format;
    means for transmitting the translated data to the one client;
    a detecting means for automatically detecting a change during an exchange of information data associated with the one client, the change indicating that the one client requires a second data format different from the first data format;
    a data receiving unit for receiving information related to the second data format from the one client in a data object definition message;
    an authorization management unit for controlling and restricting the reaction of the server to the data object definition message and for authorizing the data object definition message;
    a code generator for generating a second translation code for data translation to the second data format and replacing, in the client-translation code association information stored in the memory, the first information with a second information that indicates an association between the second translation code and the one client; and
    newly translating, using the second translation code, data within the server into the second data format; and
    transmitting the newly translated data to the one client.

46. The system of claim 45, wherein the translating means extracts information required by the one client from the data prior to sending the translated data to the one client.

47. The system of claim 45, further comprising a managing procedure that manages the data format of the data object definition message.

48. The system of claim 45, further comprising an access control procedure that controls access to the server by the data object definition messages.

49. The server computer system of claim 45, wherein the authorization management unit authorizes the data object definition message if the one client is authorized to initiate translation code generation.

50. The server computer system of claim 45, wherein the authorization management unit authorizes the data object definition message based on user roles.

* * * * *